United States Patent
Russo

(10) Patent No.: US 7,280,679 B2
(45) Date of Patent: Oct. 9, 2007

(54) SYSTEM FOR AND METHOD OF DETERMINING PRESSURE ON A FINGER SENSOR

(75) Inventor: Anthony P. Russo, New York, NY (US)

(73) Assignee: Atrua Technologies, Inc., Campbell, CA (US)

( * ) Notice: Subject to any disclaimer, the term of this patent is extended or adjusted under 35 U.S.C. 154(b) by 68 days.

(21) Appl. No.: 11/102,227

(22) Filed: Apr. 7, 2005

(65) Prior Publication Data

US 2006/0078174 A1   Apr. 13, 2006

Related U.S. Application Data

(60) Provisional application No. 60/617,519, filed on Oct. 8, 2004.

(51) Int. Cl.
*G06K 9/00* (2006.01)

(52) U.S. Cl. ............... 382/124; 382/115; 340/5.53; 340/5.83

(58) Field of Classification Search ........... 382/124, 382/115; 340/5.53, 5.83
See application file for complete search history.

(56) References Cited

U.S. PATENT DOCUMENTS

| | | | | |
|---|---|---|---|---|
| 4,827,527 A | * | 5/1989 | Morita et al. ............ | 382/127 |
| 5,657,012 A | | 8/1997 | Tait ......................... | 341/20 |
| 5,828,773 A | | 10/1998 | Setlak et al. ............. | 382/126 |
| 5,903,225 A | | 5/1999 | Schmitt et al. .......... | 340/825.31 |
| 5,907,327 A | | 5/1999 | Ogura et al. ............. | 345/339 |
| 5,920,640 A | | 7/1999 | Salatino et al. ......... | 382/124 |
| 5,940,526 A | | 8/1999 | Setlak et al. ............ | 382/124 |
| 5,943,052 A | * | 8/1999 | Allen et al. ............. | 715/787 |
| 5,953,441 A | | 9/1999 | Setlak ..................... | 382/124 |

(Continued)

FOREIGN PATENT DOCUMENTS

WO    WO 98/52145    11/1998

(Continued)

OTHER PUBLICATIONS

Mascaro et al.; "Fingernail Touch Sensor: Spatially Distributed Measurement and Hemodynamic Modeling", Proceedings of the 2000 IEEE International Conference on Robotics & Automation, 2000.*

(Continued)

*Primary Examiner*—Bhavesh M. Mehta
*Assistant Examiner*—John B Strege
(74) *Attorney, Agent, or Firm*—Haverstock & Owens LLP

(57) ABSTRACT

The present invention discloses a system for and method of calculating pressure differences using a finger sensor. A finger sensor system in accordance with the present invention comprises a finger sensor for capturing first and second of sets of image data by contacting the finger sensor and means for providing a statistical comparison between the first and second sets of image data to determine a total pressure difference. The means for providing a statistical comparison comprises a means for generating first histogram data from the first set of image data and second histogram data from the second set of image data. The means for providing statistical data correlates peaks of the first and second histogram data and also determines differences between variances of the first and second sets of image data.

40 Claims, 6 Drawing Sheets

U.S. PATENT DOCUMENTS

| | | | |
|---|---|---|---|
| 6,067,368 A | 5/2000 | Setlak et al. | 382/124 |
| 6,069,970 A | 5/2000 | Salatino et al. | 382/124 |
| 6,088,585 A | 7/2000 | Schmitt et al. | 455/411 |
| 6,098,330 A | 8/2000 | Schmitt et al. | 42/70.11 |
| 6,239,790 B1 | 5/2001 | Martinelli et al. | 345/174 |
| 6,248,655 B1 | 6/2001 | Machida et al. | 438/597 |
| 6,256,022 B1 | 7/2001 | Manaresi et al. | 345/174 |
| 6,259,804 B1 * | 7/2001 | Setlak et al. | 382/124 |
| 6,289,114 B1 | 9/2001 | Mainguet | 382/124 |
| 6,323,846 B1 | 11/2001 | Westerman et al. | 345/173 |
| 6,400,836 B2 * | 6/2002 | Senior | 382/124 |
| 6,404,900 B1 * | 6/2002 | Qian et al. | 382/103 |
| 6,408,087 B1 * | 6/2002 | Kramer | 382/124 |
| 6,578,436 B1 | 6/2003 | Ganapathi et al. | 73/862.046 |
| 6,759,264 B2 | 7/2004 | Chou et al. | 438/48 |
| 6,829,950 B2 | 12/2004 | Ganapathi et al. | 73/862.046 |
| 7,136,514 B1 | 11/2006 | Wong | 382/124 |
| 2002/0188854 A1 | 12/2002 | Heaven et al. | 713/186 |
| 2003/0002718 A1 | 1/2003 | Hamid | 382/124 |
| 2003/0028811 A1 | 2/2003 | Walker et al. | 713/202 |
| 2003/0126448 A1 | 7/2003 | Russo | 713/186 |
| 2004/0014457 A1 | 1/2004 | Stevens | 455/414.1 |
| 2004/0042642 A1 | 3/2004 | Bolle et al. | 382/115 |
| 2004/0148526 A1 | 7/2004 | Sands et al. | 713/202 |
| 2004/0186882 A1 | 9/2004 | Ting | 709/202 |
| 2004/0208348 A1 | 10/2004 | Baharav et al. | 382/124 |

FOREIGN PATENT DOCUMENTS

| | | |
|---|---|---|
| WO | WO 98/52146 | 11/1998 |
| WO | WO 98/52147 | 11/1998 |
| WO | WO 98/52157 | 11/1998 |
| WO | WO 01/65470 A1 | 9/2001 |

OTHER PUBLICATIONS

Ballard and Brown, "*Computer Vision*", Prentice Hall, 1982, pp. 66-69.

* cited by examiner

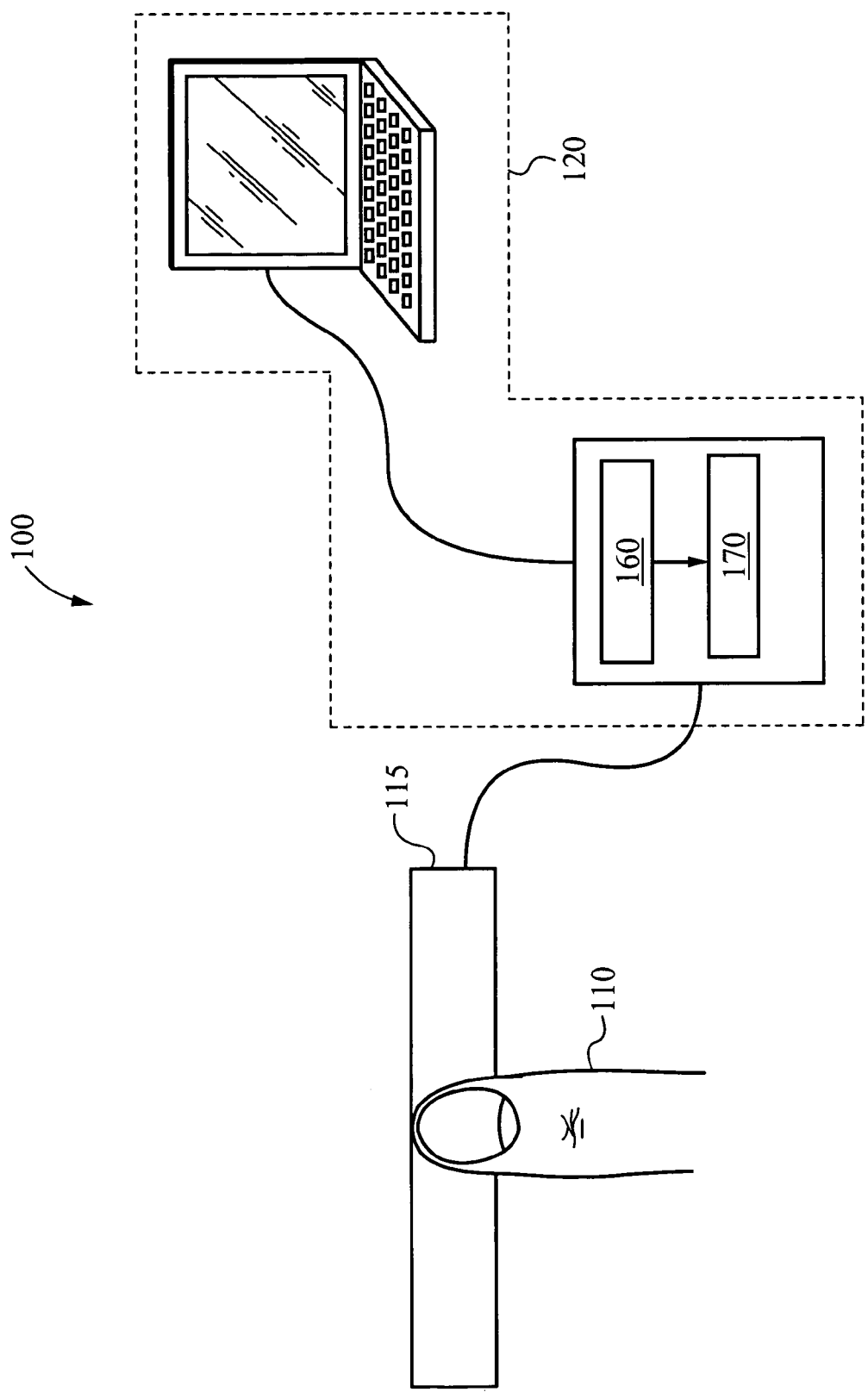

SYSTEM FOR AND METHOD OF DETERMINING PRESSURE ON A FINGER SENSOR

RELATED APPLICATION

This application claims priority under 35 U.S.C. § 119(e) of the now abandoned U.S. provisional patent application Ser. No. 60/617,519, filed Oct. 8, 2004, and titled "System for and Method of Determining Pressure on a Finger Sensor," which is hereby incorporated by reference.

FIELD OF THE INVENTION

This invention relates to biometric sensors. In particular, this invention relates to systems for and methods of determining the pressure of a finger on a finger sensor.

BACKGROUND OF THE INVENTION

Pressure sensitive devices are used in many applications. Pressure-sensitive buttons, for example, find particular use in computer games in which the pressure-sensitive button is used to accelerate, brake, or steer an on-screen object such as a car. These pressure-sensitive buttons generally rely on mechanical parts that are subject to wear and, with repeated use, become uncalibrated.

Most recently, finger sensors have been used to emulate pressure-sensitive buttons. Some finger-sensor based systems recognize that the harder a finger is pressed on the sensor, the more ridges are captured by the sensor. However, these systems cannot recognize pressure changes when all of the ridges of a finger are initially captured by the sensor so that when additional pressure is applied the sensor cannot capture additional ridges. These systems are also ill-suited to determine changes in pressures when a finger is dry, making ridges harder to detect. In these systems, any changes in pressure are difficult or impossible to detect. All of these problems are exacerbated when using today's smaller "swipe" sensors, which only sense a small fraction of the fingertip area at any given time.

Other finger-sensor based systems recognize that when a finger is on the sensor, any pressure changes result in a corresponding change in the average pixel value of the image output by the sensor. Many of these systems, however, also use an automatic gain control (AGC) that artificially varies the average pixel value to keep it relatively constant and thereby maximize the sensor's dynamic range. Such systems cannot rely on the average pixel value to track changes in pressures.

One prior art system uses a fingerprint scanner to determine absolute pressure values. U.S. Pat. No. 6,400,836 to Senior, titled "Combined Fingerprint Acquisition and Control Device," discloses estimating a "raw measure of force" applied by a finger on a scanner using an area of the finger on the scanner. Senior teaches determining the area either by counting the number of image pixels with a value above a background threshold or by finding the sum of the intensities of the "on" pixels above a threshold value. The system and method disclosed by Senior, for determining absolute pressures, is computationally expensive and because it attempts to determine absolute pressures, inherently inaccurate. Moreover, Senior teaches that a preferred embodiment of his scanner is "several times larger than that of currently available semiconductor fingerprint scanners."

What is needed is a system for and method of determining pressure that do not rely on moving parts, ridge counts, or average pixel values but instead can be implemented easily and accurately in a solid state device, whether it be a full-sized or reduced-seized "swipe sensor."

SUMMARY OF THE INVENTION

In accordance with the present invention, a finger sensor is used to determine pressure differentials when a finger is placed on the finger sensor. Finger sensors are thus able to be used on electronic devices, such as portable game devices, in applications that use pressure differentials.

In a first aspect of the present invention, a system for determining a pressure difference comprises a finger sensor for capturing first and second sets of image data by contacting the finger sensor and means for providing a statistical comparison between the first and second sets of image data to determine a total pressure difference. The means for providing a statistical comparison comprises a coarse comparator and a fine comparator. Preferably, the means for providing a statistical comparison comprises a means for generating first histogram data from the first set of image data and second histogram data from the second set of image data. The coarse comparator is configured to determine a translation between the first histogram data and the second histogram data by correlating the first histogram data to the second histogram data. Preferably, correlating the first histogram data to the second histogram data comprises comparing a first peak of the first histogram data to a second peak of the second histogram data. In one embodiment, a difference between the first peak and the second peak corresponds to an automatic gain control value for the finger sensor. Preferably, the fine comparator is configured to determine a difference between a variance value of the first set of image data and a variance value of the second set of image data.

In another embodiment, the means for providing a statistical comparison is configured to determine a first automatic gain control state based on the first set of image data and a second automatic gain control state based on the second set of image data.

In another embodiment, the means for providing a statistical comparison comprises a host computer executing an application program that receives the total pressure difference. The host computer is configured to receive the first and second sets of image data and to use them to calculate the first automatic gain control state and the second automatic gain control state. The host computer is configured to then determine the total pressure difference by determining a difference between the first automatic gain control state and the second automatic gain control state. Alternatively, the host computer is configured to receive the first automatic gain control state and the second automatic gain control state and to take their difference to determine the total pressure difference. Preferably, the first automatic gain control state is related to a median of the first set of image data and the second automatic gain control state is related to a median of the second set of image data.

In another embodiment, the finger sensor comprises first and second logical segments. The means for providing a statistical comparison determines a first segmented pressure difference related to the first logical segment and a second segmented pressure difference related to the second logical segment. The first segmented pressure difference and the second segmented pressure difference are weighted averages of the total pressure difference.

In another embodiment, the system further comprises a host computer executing an application program that receives the total pressure difference. The host computer is one of a personal computer, a personal digital assistant, a digital camera, and a portable gaming device.

In another embodiment, the finger sensor forms part of a finger swipe sensor. Preferably, the finger swipe comprises a capacitive sensor. Alternatively, the finger swipe sensor comprises one of an optical sensor and a thermal sensor. In another embodiment, the finger sensor forms part of a finger placement sensor.

In another embodiment, the finger sensor, the means for providing a statistical comparison, and the host computer form an integrated unit.

In a second aspect of the present invention, a method of determining a pressure difference comprises capturing first and second sets of image data by contacting a finger sensor and providing a statistical comparison between the first and second sets of image data to determine a total pressure difference.

In a third aspect of the present invention, a system for determining a pressure difference comprises a finger sensor for capturing two or more sets of finger image data for a finger on the finger sensor; means for comparing a first set of finger image data to a second set of finger image data; and means for using a result of comparing the first set of finger image data to the second set of finger image data to determine whether more or less pressure is applied by the finger on the finger sensor.

BRIEF DESCRIPTION OF THE DRAWINGS

FIG. 1 shows a finger exerting a pressure on a finger sensor, which transmits pressure information to an application executing on a computer, in accordance with the present invention.

DETAILED DESCRIPTION OF THE PREFERRED EMBODIMENT

Figure 2A:
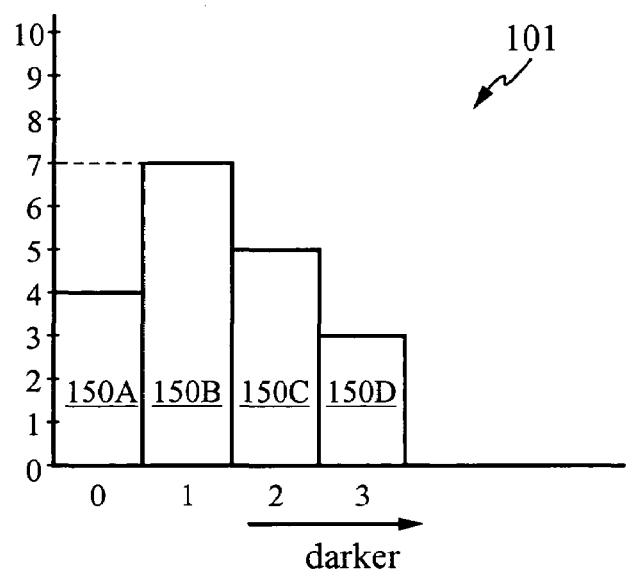
FIGS. 2A-C show histograms corresponding to the finger on the sensor of FIG. 1, exerting different pressures at different times.

Embodiments of the present invention provide an efficient way to determine a pressure and pressure differentials for emulating a pressure-sensitive device. In a preferred embodiment, the present invention uses a finger sensor to emulate the pressure-sensitive device. Preferably, in addition to performing pressure emulation, the finger sensor is also able to be used to authenticate and verify users, as well as to perform other tasks for which a finger sensor is well-suited. Because it uses a single component to perform these multiple tasks, embodiments of the present invention have smaller footprints than those systems that use multiple components to perform these tasks. By generating pressure differentials, embodiments of the present invention compute relative pressures more accurately and with less computational resources than do prior art systems, some of which determine only absolute pressures.

In accordance with the present invention, a finger sensor captures pixel data that corresponds to characteristics used to identify a fingerprint. These characteristics include ridges, valleys, bifurcations, pores, scars, and other minutiae. Systems and methods for reading and assembling fingerprint images using fingerprint sensors are described in more detail in U.S. patent application Ser. No. 10/194,994, titled "Method and System for Biometric Image Assembly from Multiple Partial Biometric Frame Scans," and filed Jul. 12, 2002, which is hereby incorporated by reference. These pixel data are transmitted to a pressure calculator, which determines the pressure exerted by the finger on the sensor. As described in more detail below, the pressure and thus changes in pressure are determined by tracking a statistic corresponding to the pixel data.

Furthermore, embodiments of the present invention also account for very large or very small pixel values by translating those values (by, for example, using automatic gain control) so that pixel values are more distinguishable and can be processed more easily. As used herein, translating pixel values means, for example, adding or subtracting a constant value to each pixel value, so that all of the pixel values are maintained within a pre-defined range. In this way, pixel values are easily distinguishable (impossible, for example, when a saturation level has been reached) and thus can be easily processed. This is analogous to changing the contrast on a television set or normalizing data points. The processing portion also tracks these translations in determining pressure. The statistical calculations are performed quickly and, because they require no moving parts, more accurately.

In one embodiment, the pressure calculator transmits the relative pressure to an application that uses pressures or pressure differentials. One application is a computer game program that emulates a moving car. A left portion of the sensor functions as an accelerator of the car and a right portion functions as a brake. When a player exerts an increasing pressure on the left portion of the sensor, the car accelerates; when the player exerts an increasing pressure on the right portion of the sensor, the car brakes harder. It will be appreciated that pressure sensitive devices in accordance with the present invention find use in many applications besides game programs, such as those described here. The use of a finger sensor to emulate pressure-sensitive and other electronic input devices is described in detail in U.S. patent application Ser. No. 10/873,393, titled "System and Method for a Miniature User Input Device," and filed Jun. 21, 2004, which is hereby incorporated by reference. It will also be appreciated that statistics other than those described here can be used to determine pressures and changes in pressure exerted by a finger on a sensor.

FIG. 1 shows a finger 110 exerting a pressure on a finger sensor 115, which is coupled to a computer system 120. In operation, the finger sensor 115 captures raw frame data and sends the raw frame data, in the form of rectangular pixel images, many times per second to an application program 160 (also referred to as the pressure calculator) executing on the computer system 120. The pressure calculator 160 uses the raw frame data, as described below, to determine a pressure or pressure differential, which is then used by an application program 170, also executing on the computer system 120. The application program 170 is a computer game program or any other type of program that uses pressures or pressure differentials.

It will be appreciated that while the present discussion assumes that the pressure or pressure differential is calculated on the computer system 120, in other embodiments the pressure or pressure differential is calculated in circuitry on the finger sensor 115 or even on a remote system or hardware device (not shown). It will be appreciated that the pressure calculator 160 and other components described herein can be implemented in software, hardware, or any combination of software and hardware.

In a preferred embodiment, the pressure calculator 160 calculates a histogram of the pixel data to determine a pressure or a pressure differential, such as described below. In this preferred embodiment, the pressure calculator 160 processes pixel statistics using a two-step process. In the first step, the pressure calculator 160 checks statistics for pixel data to determine whether the pixel data has been translated, such as by using automatic gain control circuitry, and determines the amount of translation. The automatic gain control circuitry can be triggered when the system detects significant changes in captured pixel data, data corresponding to much darker or much lighter images. These statistics are then checked for large changes in pressure on the finger sensor 115. In the second step, if the automatic gain control circuitry had not been triggered, the pressure calculator 160 checks statistics for small changes in pixel data, to determine small pressure changes on the finger sensor 115. The calculated pressure or pressure differential data is made available to the application program 170, which uses the pressure information to, for example, control a game or aid in user navigation tasks.

Figure 2B:
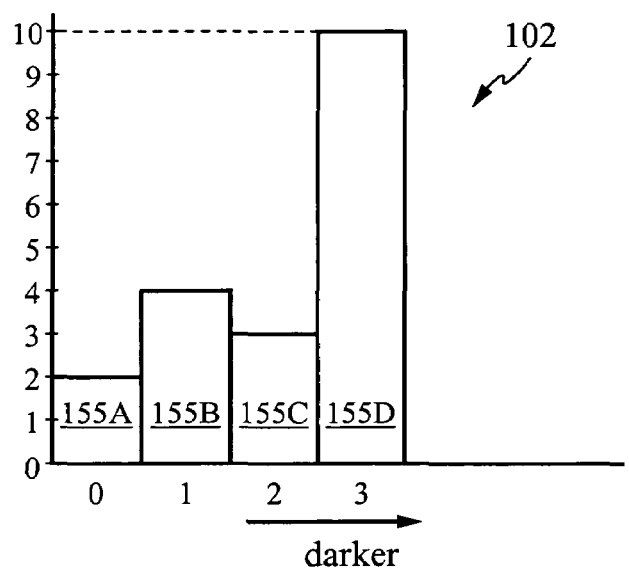
Figure 2C:
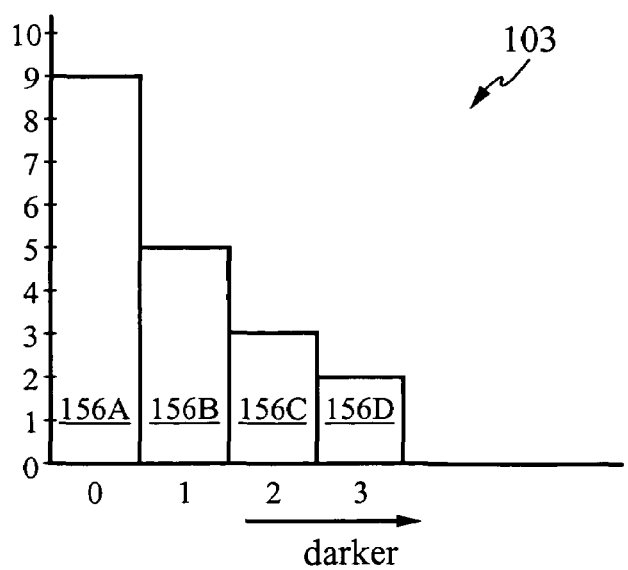

FIGS. 2A-C show histograms 101-103, respectively, for pixel data captured by the finger sensor 115 when the finger 110 is positioned on the finger sensor 115 at three different times. In operation, the user's finger 110 is placed on the finger sensor 115 and pixel data is captured by the finger sensor 115. Thus, the histogram 101 of FIG. 2A corresponds to pixel data captured when the finger 110 is on the sensor 115 at time $t_0$; the histogram 102 of FIG. 2B corresponds to pixel data captured when the finger 110 is on the sensor 115 at time $t_1$; and the histogram 103 of FIG. 2C corresponds to pixel data captured when the finger 110 is on the sensor 115 at time $t_2$. Here, time $t_1$ is later than $t_0$, and time $t_2$ is later than $t_1$. Each of the FIGS. 2A-C and 3A-B also has an arrow at the bottom, labeled "darker" to indicate the direction of darker (higher values of) pixels.

Preferably, pixels having large values correspond to ridges on the finger 110, and pixels having small values correspond to valleys on the finger 110. Those skilled in the art will recognize that this correspondence is arbitrary: in an alternative embodiment, pixels having large values correspond to valleys and those with small values correspond to ridges. All the pixel data values are processed and used to generate a histogram. The horizontal axis of each histogram 101-103 corresponds to pixel values and the vertical axis corresponds to the number of pixels having that value. Thus, for example, referring to FIG. 2A, the bar 150A indicates that 4 pixels have the pixel value 0; the bar 150B indicates that 7 pixels have the pixel value 1; the bar 150C indicates that 5 pixels have the value 2; and the bar 150D indicates that 3 pixels have the value 3. The histogram 102 (corresponding to pixel data captured at time $t_1$) and the histogram 103 (corresponding to pixel data captured at time $t_2$) are similarly described and will not be described here.

In analyzing the histograms, those skilled in the art will recognize that an increase in the number of darker (e.g., larger) pixel values generally corresponds to an increased pressure of a finger on a finger sensor. Referring to FIGS. 2A and 2B, it is noted that the maximum (peak) value of the histogram 101 corresponds to the bar 150B for the pixel value 1. In contrast, the peak value of the histogram 102, at a later time ($t_1$), corresponds to the bar 155D, for the pixel value 3. Those skilled in the art will recognize that this increase (from 1 to 3) indicates a pressure increase on the finger sensor 115 from the time $t_0$ to the time $t_1$. Similarly, referring to FIGS. 2B and 2C, it is noted that the peak value of the histogram 103 corresponds to the bar 156A for the pixel value 0. Those skilled in the art will recognize that this decrease (from 3 to 0) indicates a pressure decrease on the finger sensor 115 from the time $t_1$ to the time $t_2$. These pressure increases and decreases are transmitted to application programs that use them as input.

In accordance with some embodiments of the present invention, automatic gain control circuitry is used to translate pixel data, a process similar to normalization. Because of these translations, peaks cannot merely be compared to determine pressure because these peaks are artificially shifted every time the AGC changes its state. Here, the term "AGC state" refers to a statistical property of pixel (e.g., finger image) data used to track changes in the pixel data and thereby used to trigger an automatic gain control circuitry. The effect of a change in AGC state is a corresponding shift (left or right) or shifts in the shape of the histogram (e.g., a translation). These translations are accounted for in another part of the pressure processing. These translations are recognized and thus accounted for using the process described below.

Figure 3A:
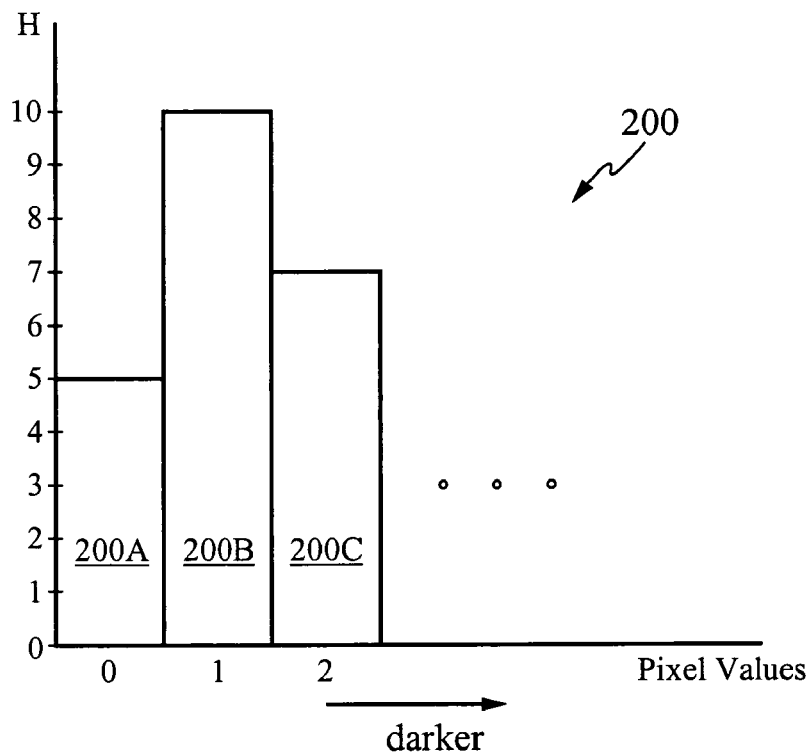
FIGS. 3A-B show histograms corresponding to the finger on the sensor of FIG. 1 exerting different pressures at different times and generated using automatic gain control circuitry.
Figure 3B:
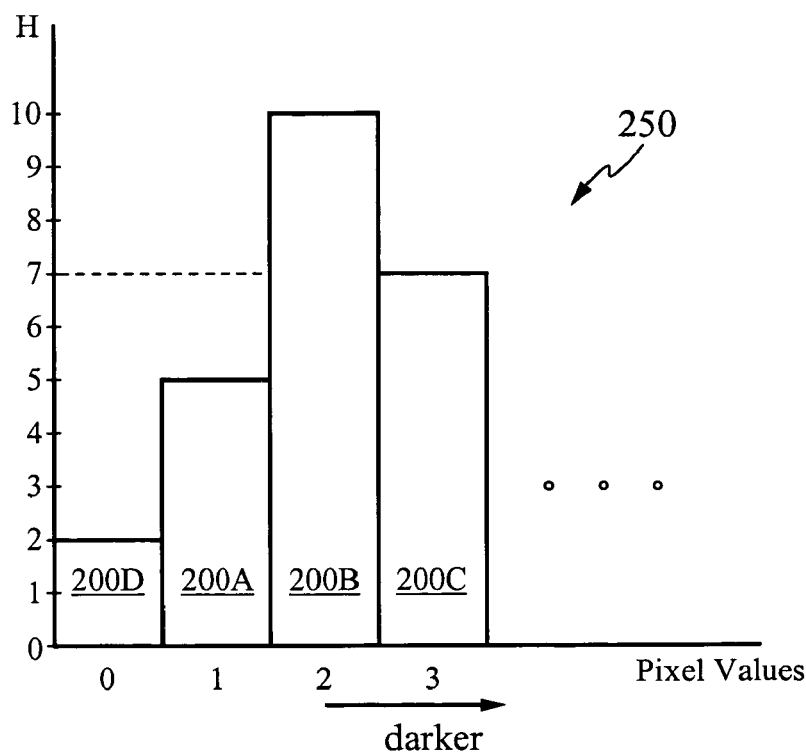

FIG. 3A shows a histogram 200 generated when the finger 110 is positioned on the finger sensor 115 at a pressure at a time $t_3$. FIG. 3B shows a histogram 250 generated when the finger 110 is positioned on the finger sensor 115 at a pressure at a time $t_4$. The histograms 200 and 250 are similar, with the histogram 250 shifted to the right on the horizontal axis: the bars 200A-C have each shifted one unit to the right. This right shift corresponds to an automatic gain control circuitry being triggered. This right shift indicates that the pixel data was approaching high values and has been lightened (e.g., the corresponding pixel values decreased). Similarly, if the bars 200A-C had been shifted to the left, this indicates that the pixel data was approaching low values and had been darkened (e.g., the corresponding pixel values increased). Thus, by monitoring left and right shifts in the histograms, it can be determined that the automatic gain control circuitry has been triggered and, thus, that a pressure on a finger sensor has either increased or decreased. It will be appreciated that while FIGS. 3A and 3B illustrate a shift of one unit, histograms generated according to the present invention can be shifted from one another by any amount (0, 1, 2, etc.), up to the maximum pixel value used by a finger sensor to represent finger images. Preferably, circuitry in the finger sensor 115 that is responsible for the automatic gain control can send the amount of the shift to the pressure calculator 160 so that the histogram correlation step is eliminated. In an alternative embodiment, the finger sensor 115 is configured to determine the amount of the shift, which is then sent to the pressure calculator 160. In this way, more processing is off loaded to the finger sensor 115, allowing the computer system 120 to devote more processing time and other resources to other tasks.

Embodiments of the present invention thus track statistics corresponding to pressure changes similar to a coarse and fine adjustor. Tracking changes in sequential histogram peaks corresponds to a fine adjustor and is referred to here as a fine correlation; tracking shifts in sequential histograms corresponds to a coarse adjustor and is referred to here as a coarse correlation. In a preferred embodiment, the automatic gain control circuitry is configured to trigger just before a pixel forming a histogram reaches the highest value that the sensor can distinguish (e.g., before saturating).

As used herein a coarse adjustor refers to hardware, software, or a combination of both that tracks translations in statistics related to pixel data. The translations take into account, for example, automatic gain control. A fine adjustor refers to hardware, software, or a combination of both that tracks generally smaller changes in statistics related to pixel data. These changes do not account for automatic gain control.

In an alternative embodiment, if the sensor has no AGC capability of its own, the host or other computing device can approximate the AGC state itself. This requires more computations and limits the dynamic range of the sensor and hence the pressure determination; accordingly, the pressure calculated is less accurate than when the pressure is calculated by the sensor. In this embodiment, the AGC states can be calculated by determining the median pixel intensity value M. Histograms do not have to be correlated in this embodiment. Instead, the shift between statistics at time $t_1$, used to determine pressure changes, is given by $M_1-M_0$, where $M_1$ and $M_0$ are the medians at times $t_1$ and $t_0$, respectively.

Figure 4:
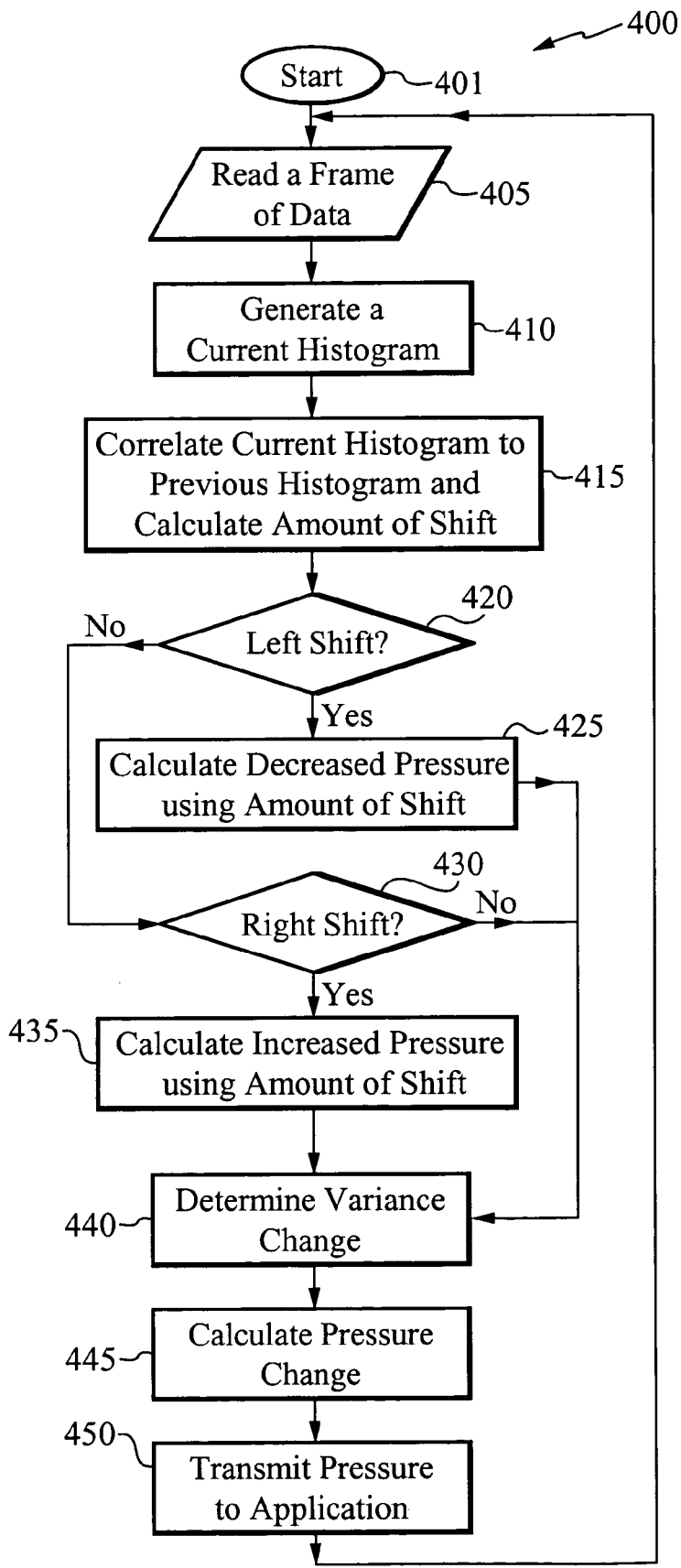
FIG. 4 is a flow chart showing the steps used to determine the change in pressure exerted on a finger sensor in accordance with the present invention.

FIG. 4 is a flow chart 400 illustrating the steps used to determine a pressure change on a sensor in accordance with one embodiment of the present invention, using both coarse and fine correlation. Referring to FIGS. 1 and 4, in the start step 401, any parameters used are initialized: count values and the previous histogram (described below) are all set to default values. Next, in the step 405, a frame of data is read on the finger sensor 115. In the step 410, a current histogram is generated, and in the in step 415 the current histogram is correlated with a previous histogram and the amount of any shift between the two is calculated. In the step 420, it is determined whether a left shift occurred between the two. If a left shift has occurred between the previous and current histograms, processing continues to the step 425, where the decreased pressure is calculated using the amount of the calculated shift. After the step 425, processing continues to the step 440. If a left shift has not occurred, processing continues from the step 420 to the step 430, where it is determined whether a right shift has occurred between the previous and current histograms. If a right shift has occurred, processing continues to the step 435, where an increased pressure is calculated using the amount of the calculated shift. From the step 435, processing continues to the step 440. The steps 420, 425, 430, and 435 together correspond to determining a coarse estimate of relative pressure.

Regardless of whether a shift has been detected in the steps 420 and 430, all processing continues to the step 440, where a finer-grained pressure difference (i.e., a finer estimate) in subsequently generated histograms is determined. Preferably, this finer estimate is determined by calculating a variance of the pixel data. Higher variance usually implies greater pressure or pressure change. In the step 445, this finer estimate is combined with the coarse estimate of the histogram shift to determine the final total pressure or pressure change, and processing continues to the step 450. In the preferred embodiment, the step 445 combines the coarse estimate and the finer estimate using a weighted average. Those skilled in the art will recognize that there are many different ways to combine the coarse and finer estimates including, but not limited to, exponential smoothing, piecewise-linear and non-linear combinations.

In the step 450, the pressure or pressure change is transmitted to a host application that uses the pressure changes. Processing loops back to the step 405 with the current histogram now becoming the previous histogram. In one embodiment, the steps 410 through 450 together correspond to the steps performed by the pressure calculator.

Figure 5:
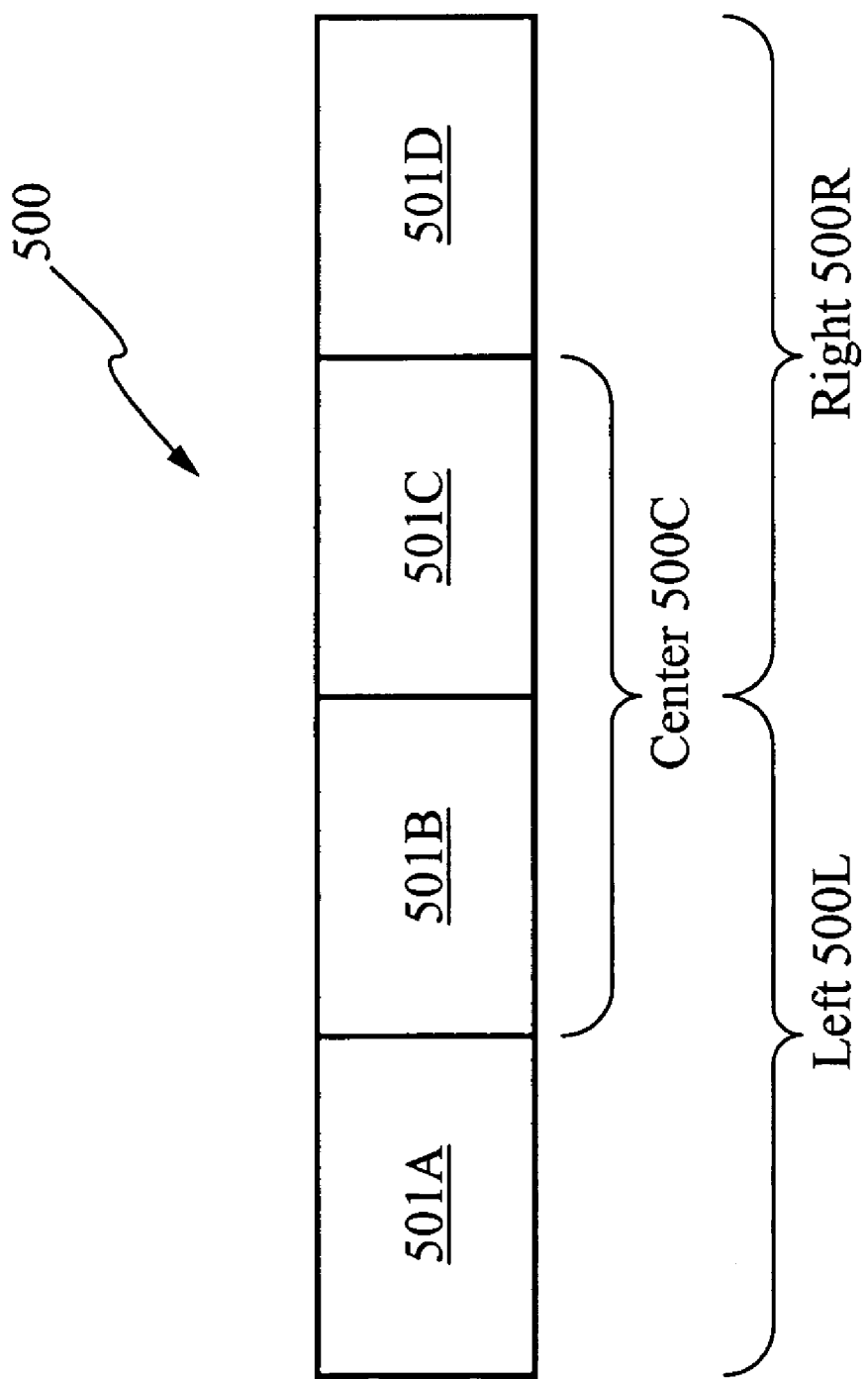
FIG. 5 shows a finger sensor divided into 4 parts that together define a left sensor, a center sensor, and a right sensor, in accordance with the present invention.

In accordance with the present invention, a finger sensor is physically or logically divided into multiple segments. For example, a left segment of the finger sensor is used to detect pressure to emulate a brake for a game program that simulates a moving car, a center segment of the finger sensor is used to detect pressure to emulate a gear shifter, and a right segment of the finger sensor is use to detect pressure to emulate an accelerator. In accordance with the present invention, the average pixel value is calculated on each segment of the finger sensor 500 in FIG. 5, $Avg_{LEFT}$, $Avg_{RIGHT}$, $Avg_{CENTER}$. FIG. 5 shows the finger sensor 500 logically divided into four logical segments 501A-D. The segments 501A and 501B together correspond to a left segment 500L of the finger sensor 500, the segments 501B and 501C together correspond to a center segment 500C of the finger sensor 500, and the segments 501C and 501D together correspond to a right segment 500R of the finger sensor 500. The pressure values for each segment 500L, 500R, and 500C are calculated as a percentage of the overall pressure $P_{TOTAL}$ on the finger sensor 500, determined in the step 445 of FIG. 4. For example, the pressure on the segment 500L is $P_{LEFT}=P_{TOTAL}*(Avg_{LEFT})/(Avg_{LEFT}+Avg_{RIGHT}+AVG_{CENTER})$. The pressure the segment 500C is $P_{CENTER}=P_{TOTAL}*(Avg_{CENTER})/(Avg_{LEFT}+Avg_{RIGHT}+AVG_{CENTER})$. The pressure on the segment 500R is $P_{RIGHT}=P_{TOTAL}*(Avg_{RIGHT})/(Avg_{LEFT}+Avg_{RIGHT}+AVG_{CENTER})$. In an alternative embodiment, histograms are generated for each segment 500L, 500C, and 500R of the finger sensor 500 and an analysis, such as described above and with reference to FIG. 4, is performed on each of the segments 500L, 500C, and 500R.

Figure 6:
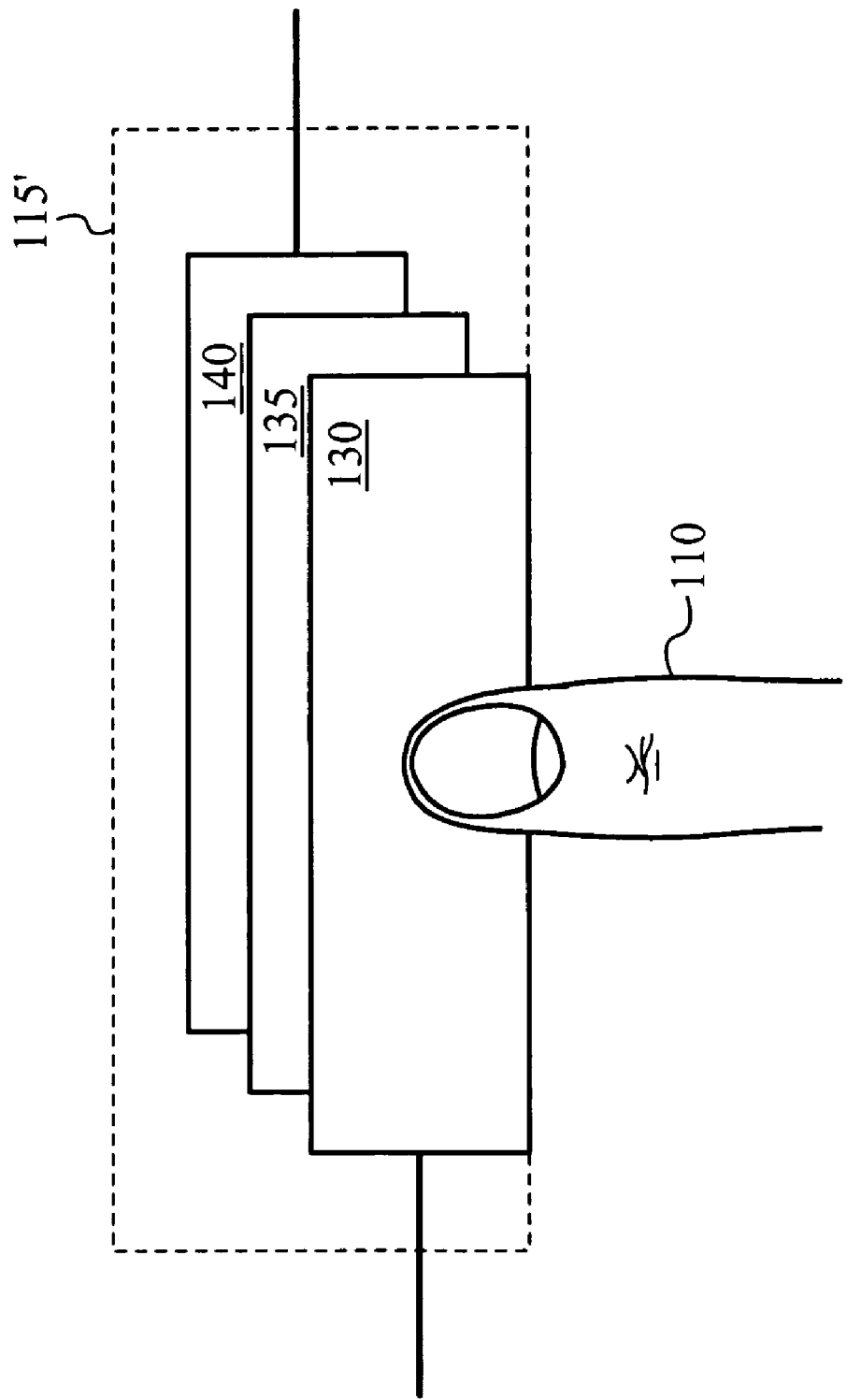
FIG. 6 shows the components that form a finger sensor and pressure calculator, in accordance with the present invention.

It will be appreciated that the method of the present invention can be divided among any number of components. For example, FIG. 6 shows a finger sensor 115' in accordance with one embodiment of the present invention, in which multiple processing components form part of the finger sensor 115'. The finger sensor 115' comprises a sensing array 130 for capturing pixel data; a statistical generator 135 used to generate histograms; and a statistical processor 140 used to track peak shift and histogram shifts. The statistical generator 135 and the statistical processor 140 together are referred to as a pressure calculator. It will be appreciated that any one of the statistical generator 135 and the statistical processor 140 can comprise a memory for storing pixel and histogram data. Moreover, both can be located on a host system instead, thereby reducing the processing required of the finger sensor 115'. It will be further appreciated that each of the multiple processing components 135 and 140 can use any combination of hardware and software to perform its respective tasks.

It will be appreciated that the embodiments described above can be modified in many ways in accordance with the present invention. For example, while the histograms described above correspond to grey-scale values of between 0 and 3, inclusive, it will be appreciated that grey-scale values having other ranges, such as between 0 and 255, can also be used. It will also be appreciated that many kinds of finger sensors can be used in accordance with the present invention including, but not limited to, placement sensors and swipe sensors, as well as capacitive, thermal, and optical sensors.

It will further be appreciated that while the examples above describe using a finger to contact a finger image sensor to generate images, other objects can also be used. For example, a deformable patterned stylus, such as those used to input data on the screen of a personal digital assistant, can also be used to contact a finger image or other sensor, such that a pressure differential is determined as described above.

It will be readily apparent to one skilled in the art that other modifications may be made to the embodiments without departing from the spirit and scope of the invention as defined by the appended claims.

I claim:

1. A system comprising:
    a finger sensor for capturing first and second of sets of image data by contacting the finger sensor; and
    means for comparing statistical distributions of the first and second sets of image data to determine a total pressure difference, wherein the means for comparing comprises a coarse comparator and a fine comparator.

2. The system of claim 1, wherein the means for comparing statistical distributions further comprises a means for generating first histogram data from the first set of image data and second histogram data from the second set of image data.

3. The system of claim 2, wherein the coarse comparator is configured to determine a translation between the first histogram data and the second histogram data.

4. The system of claim 3, wherein the translation is determined by correlating the first histogram data to the second histogram data.

5. The system of claim 4, wherein correlating the first histogram data to the second histogram data comprises comparing a first peak of the first histogram data to a second peak of the second histogram data.

6. The system of claim 5, wherein a difference between the first peak and the second peak corresponds to an automatic gain control value for the finger sensor.

7. The system of claim 3, wherein the fine comparator is configured to determine a difference between a variance value of the first set of image data and a variance value of the second set of image data.

8. The system of claim 1, wherein the means for comparing statistical distributions is configured to determine a first automatic gain control state based on the first set of image data and a second automatic gain control state based on the second set of image data.

9. The system of claim 8, wherein the means for comparing statistical distributions comprises a host computer executing an application program that receives the total pressure difference.

10. The system of claim 9, wherein the host computer is configured to receive the first and second sets of image data and to determine therefrom the first automatic gain control state and the second gain control state, the host computer further configured to determine the total pressure difference from a difference between the first automatic gain control state and the second automatic gain control state.

11. The system of claim 9, wherein the host computer is configured to receive the first automatic gain control state and the second automatic gain control state and to determine therefrom the total pressure difference.

12. The system of claim 8, wherein the first automatic gain control state is related to a median of the first set of image data and the second automatic gain control state is related to a median of the second set of image data.

13. The system of claim 1, wherein the finger sensor comprises first and second logical segments, wherein the means for comparing statistical distributions is configured to determine a first pressure difference related to the first logical segment and a second pressure difference related to the second logical segment.

14. The system of claim 13, wherein the first pressure difference and the second pressure difference are weighted values of the total pressure difference.

15. The system of claim 1, further comprising a host computer executing an application program that receives the total pressure difference, the host computer comprising a device selected from the group consisting of a personal computer, a personal digital assistant, a digital camera, and a portable gaming device.

16. The system of claim 1, wherein the finger sensor forms part of a finger swipe sensor.

17. The system of claim 16, wherein the finger sensor comprises a capacitive sensor.

18. The system of claim 16, wherein the finger swipe sensor comprises one of an optical sensor and a thermal sensor.

19. The system of claim 1, wherein the finger sensor forms part of a finger placement sensor.

20. The system of claim 9, wherein the finger sensor, the means for comparing statistical distributions, and the host computer form an integrated unit.

21. A method of determining a pressure difference comprising:
    capturing first and second of sets of image data by contacting a finger sensor; and
    comparing statistical distributions of the first and second sets of image data to determine a total pressure difference by performing a coarse comparison and a fine comparison.

22. The method claim 21, wherein comparing statistical distributions comprises generating first histogram data from the first set of image data and second histogram data from the second set of image data.

23. The method of claim 22, wherein comparing statistical distributions further comprises determining a translation between the first histogram data and the second histogram data.

24. The method of claim 23, wherein determining a translation comprises correlating the first histogram data to the second histogram data.

25. The method of claim 24, wherein correlating the first histogram data to the second histogram data comprises comparing a first peak of the first histogram data to a second peak of the second histogram data.

26. The method of claim 25, wherein a difference between the first peak and the second peak corresponds to an automatic gain control value for the finger sensor.

27. The method of claim 23, wherein comparing statistical distributions further comprises determining a difference between a variance value of the first set of image data and a variance value of the second set of image data.

28. The method of claim 21, wherein comparing statistical distributions comprises determining a first automatic gain control state based on the first set of image data and a second automatic gain control state based on the second set of image data.

29. The method of claim 28, further comprising executing on a host computer an application program that receives the total pressure difference.

30. The method of claim 29, wherein the host computer is configured to receive the first and second sets of image data and to determine therefrom the first automatic gain control state and the second automatic gain control state, the host computer further configured to determine the total pressure difference from a difference between the first automatic gain control state and the second automatic gain control state.

31. The method of claim 29, wherein the host computer is configured to receive the first automatic gain control state and the second automatic gain control state and to determine therefrom the total pressure difference.

32. The method of claim 28, wherein the first automatic gain control state is related to a median of the first set of image data and the second automatic gain control state is related to a median of the second set of image data.

33. The method of claim 21, wherein the finger sensor comprises first and second logical segments, and further wherein comparing statistical distributions comprises determining a first pressure difference related to the first logical segment and a second pressure difference related to the second logical segment.

34. The method of claim 33, wherein the first pressure difference and the second pressure difference are weighted values of the total pressure difference.

35. The method of claim 21, further comprising executing on a host computer an application for receiving the total pressure difference, wherein the host computer comprises a device selected from the group consisting of a personal computer, a personal digital assistant, a digital camera, and a portable gaming device.

36. The method of claim 21, wherein the finger sensor forms part of a finger swipe sensor.

37. The method of claim 36, wherein the finger sensor comprises a capacitive sensor.

38. The method of claim 36, wherein the finger swipe sensor comprises one of an optical sensor and a thermal sensor.

39. The method of claim 21, wherein the finger sensor forms part of a finger placement sensor.

40. A system for determining a pressure difference comprising:

a finger sensor for capturing first and second sets of finger image data for a finger on the finger sensor; and a pressure calculator coupled to the finger sensor, wherein the pressure calculator is configured to compare a first statistical distribution of the first set of finger image data to a second statistical distribution of the second set of finger image data by performing a coarse comparison and a fine comparison to determine whether more or less pressure is applied by the finger on the finger sensor.

* * * * *